April 8, 1969

R. C. DAWN ET AL 3,437,624

AQUEOUS DISPERSIONS OF POLYURETHANE POLYMERS

Filed Jan. 29, 1968

INVENTORS
Robert C. Dawn
Newlin S. Nichols
BY
ATTORNEY

United States Patent Office 3,437,624
Patented Apr. 8, 1969

3,437,624
AQUEOUS DISPERSIONS OF POLYURETHANE POLYMERS
Robert C. Dawn, Cleveland, Ohio, and Newlin S. Nichols, Dearborn, Mich., assignors to Wyandotte Chemicals Corporation, Wyandotte, Mich., a corporation of Michigan
Continuation-in-part of application Ser. No. 362,588, Apr. 27, 1964. This application Jan. 29, 1968, Ser. No. 709,156
Int. Cl. C08g 41/00; C09d 5/02; B01f 3/12
U.S. Cl. 260—29.2
19 Claims

ABSTRACT OF THE DISCLOSURE

Aqueous dispersions of polyurethane polymers are prepared by reacting together (I) an isocyanate-terminated polyurethane polymer formed from (a) active hydrogen containing organic compounds and (b) organic polyisocyanates and (II) a chain extender containing active hydrogen. Polymer (I) is mixed with water, dispersed in the water at an initial temperature of from about −5 to 20° C., and chain extender (II) added to the water dispersion of polymer (I) with agitation.

---

Figure 3:
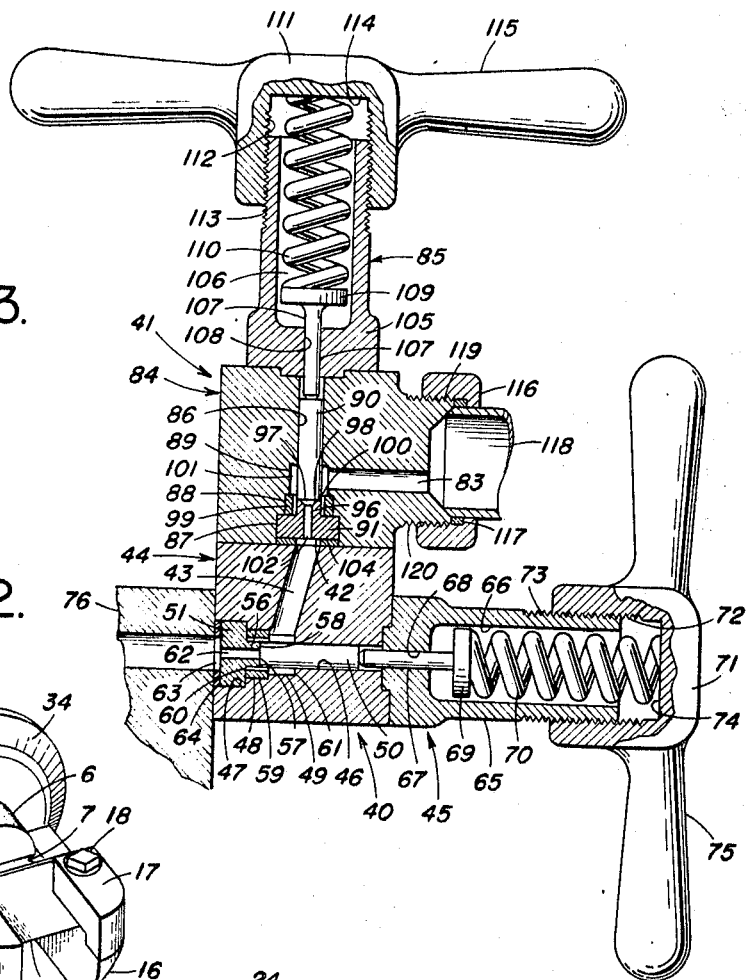

This application is a continuation-in-part of U.S. patent application Ser. No. 362,588, filed Apr. 27, 1964, now abandoned.

It is disclosed in the prior art that polyurethane polymers can be prepared by a two-step process. In the first step, an isocyanate-terminated prepolymer is prepared by interacting an active hydrogen containing organic compound with an organic isocyanate. In the second step, chain extenson is accomplished by reaction of the isocyanate-terminated prepolymer with a chain extender containing active hydrogen such as, for example, water, amines and other chain extending agents. Diamines are particularly useful as chain extending agents. The preparation of polyurethanes is disclosed in many references including the texts entitled Polyurethanes by Bernard A. Dombrow, published by Reinhold Publishing Corporation, New York, N.Y., 1957, and Polyurethanes; Chemistry and Technology by J. H. Saunders and K. C. Frisch, published by Interscience Publishers, New York-London, wherein disclosure is made of methods for producing polyurethanes including those wherein an isocyanate-terminated prepolymer is first prepared and then reacted with a chain extending agent.

For many applications it is desirable to prepare stable aqueous dispersions of polyurethane polymers. For example, such aqueous dispersions are desirable as an impregnant for paper to increase burst strength and fold resistance, as coatings for boxboard to increase abrasion resistance, as coatings for textiles to provide waterproof fabric which is light in weight and which retains a high degree of flexibility and wear resistance, as coatings for leather, as a material to make elastic or plastic foams, for elastic fibers by latex coagulating processes, for the preparation of articles by dipping processes, and for casting on a flat surface to form high-strength films useful for packaging and other protective coatings.

However, in the preparation of aqueous dispersions of polyurethane polymers by the prior art methods, difficult problems are presented with regard to the initial reaction of polyisocyanates with active hydrogen containing compounds due to a tendency toward unsatisfactory film formation, mechanical instability, and coagulation of the dispersion.

Accordingly, it is a purpose of this invention to prepare mechanically stable aqueous dispersions of polyurethane polymers characterized by good film-forming properties.

According to the present invention, aqueous dispersions of polyurethane polymers characterized by good film-forming properties and improved mechanical stability are prepared by reacting together (I) isocyanate-terminated polyurethane polymer formed from (a) active hydrogen containing organic compound and (b) organic polyisocyanate and (II) chain extender containing active hydrogen. In accordance with this invention the improved mechanical stability is obtained by mixing polymer (I) with water and dispersing the polymer (I) in the water at an initial temperature of from about −5 to 20° C. The chain extender (II) is then added to the water dispersion of polymer (I) with rapid agitation. It is often advantageous if the chain extender is also pre-cooled to a temperature of from about 0 to 20° C.

The isocyanate-terminated polyurethane polymer (I), also referred to as a "prepolymer," employed as a starting material according to the present invention may be any such type compound which may be obtained by the reaction of a selected active hydrogen containing compound (a) having an average molecular weight of at least about 300 with a stoichiometric excess of an organic polyisocyanate (b). Such prepolymers are capable of molecular weight increase through chain extension with the particular chain extension agents to be described.

In general, any organic compound containing at least 2 active hydrogen atoms may be reacted with a stoichiometric excess of an organic polyisocyanate to get a prepolymer or an initial addition product which is then capable of a molecular weight increase through chain extension with a chain extender according to the process of this invention. Active hydrogen containing compounds of this sort include the polyalkylene ether glycols, the poly (alkylene ether-alkylene thioether) glycols, polyalkylene esters of alkylene diacids, polyalkylene esters of arylene diacids, esters of polyhydric alcohols and hydroxy fatty acids, alkyd resins containing hydroxyl or carboxyl end groups and polyester amide resins. The term "active hydrogen atoms" refers to hydrogens which, because of their position in the molecule, display activity according to the Zerewitinoff test as described by Kohler in J. Am. Chem. Soc., 49, 3181 (1927). Linear compounds containing hydrocarbon groups linked together by ether or ester linkages and having terminal hydroxyl groups are preferred representatives of this type of compound. A particularly useful class of active hydrogen containing compounds for this purpose is the polyalkylene ether glycols which have the general formula $H(OR)_nOH$ where R is an alkylene radical and $n$ is an integer which in a preferred embodiment is sufficiently large that the compound as a whole has a molecular weight of at least about 300. Molecular weights of up to 10,000 are satisfactory. Polyethylene ether glycols, poly-1,2-propylene ether glycol, polytetramethylene ether glycol, poly-1,2-dimethylene ether glycol, and polydecamethylene ether glycols are typical members of this class. Not all of the alkylene radicals present need to be the same. Glycols containing a mixture of radicals as in the compound $HO(CH_2OC_2H_4O)_nH$, or $$HO(C_2H_4O)(C_3H_6O)_m(C_2H_4O)_nH$$

wherein $n$ and $m$ are together sufficient for attainment of the desired molecular weight can be used. Polyethylene ether-polypropylene ether glycols, having the above-indicated formula, are among the preferred glycols. Polyethylene glycols, poly-1,2-propylene ether glycols, polydecamethylene ether glycols, and poly-1,2-dimethylethyl ether glycols are representative of other operative compounds. Characteristics of representative preferred polyalkylene or polyalkylene ether glycols including hydroxyl numbers and molecular weights are found in Table A below.

TABLE A.—TYPICAL PROPERTIES OF REPRESENTATIVE PREFERRED POLYALKYLENE ETHER GLYCOLS

| Glycol | Percent polyoxyethylene | M. wt. of polyoxypropylene base | Hydroxyl number | Molecular wt. |
|---|---|---|---|---|
| Polyoxyethylene-polyoxypropylene glycols: | | | | |
| L31 | 15 | 940 | 102.3 | 1,065 |
| L61 | 15 | 1,750 | 56.1 | 2,000 |
| L81 | 15 | 2,250 | 41.7 | 2,690 |
| P75 | 50 | 2,050 | 27.3 | 4,120 |
| F77 | 70 | 2,050 | 16.6 | 6,760 |
| F88 | 80 | 2,250 | 11.2 | 10,000 |
| Polyoxypropylene glycols: | | | | |
| PPG 400 | 0 | | 261.5 | 429 |
| PPG 765 | 0 | | 145.0 | 765 |
| PPG 1000 | 0 | | 112.0 | 1,000 |
| PPG 2000 | 0 | | 56.4 | 1,995 |

Instead of the hydrocarbon portion of the polyether glycols used in forming these polyurethane products being entirely alkylene, it can contain arylene or cycloalkylene radicals together with the alkylene radicals as, for example, in the condensation product of a polyalkylene ether glycol with a,a'-dibromo-p-xylene in the presence of alkali. In such products, the cyclic groups inserted in the polyether chain are preferably phenylene, naphthylene or cyclohexylene radicals or these radicals containing alkyl or alkylene substituents, as in the tolylene, phenylethylene or xylylene radicals. Elastomers made using polyalkylene-arylene or polyalkylene-cycloalkylene ether glycols have improved freeze resistance as compared with the corresponding elastomers containing no cyclic radicals.

Another class of glycols useful in making polyurethanes extensible according to this invention are the polyalkylene ether-polythioether glycols. Such glycols may be represented by the formula $HO(QY)_nH$ in which Q represents hydrocarbon radicals, at least some of which are alkylene, Y represents chalcogen atoms, some of which are sulfur and the rest oxygen, and $n$ is an integer which, in a preferred embodiment, is large enough so that the glycol has a molecular weight of at least about 300. These products may be made by condensing together glycols and thioglycols in the presence of a catalyst such as p-toluenesulfonic acid. As will be noted, these compounds resemble the polyalkylene ether glycols except that some of the alkylene radicals are joined by sulfur rather than oxygen. In each case, however, the compounds have terminal hydroxy groups which take part in the reaction with the organic polyisocyanate.

Also included in the active hydrogen containing compounds which may be employed are the high molecular weight, substantially linear polyesters. Products of this sort are described in U.S. Patents 2,621,166, 2,625,531 and 2,625,532.

The polyesters are prepared by reacting together glycols such as ethylene glycol, diethylene glycol, triethylene glycol, trimethylene glycol, 1,2-propylene glycol, tetramethylene glycol, 2,3-butylene glycol, pentamethylene glycol, 1,6-hexylene glycol, and decamethylene glycol, and dicarboxylic acids such as malonic, maleic, succinic, adipic, pimelic, sebacic, oxalic, phthalic, terephthalic, hexahydroterephthalic, and para-phenylene-diacetic acids, decamethylene dicarboxylic acid, and the like. Another useful group of compounds for this purpose are the polyester amide resins having terminal hydroxy groups. The preferred polyesters may be represented by the formula $HOB-OOC-B'-COO_nBOH$ in which B and B' are hydrocarbon radicals derived from the glycol and dicarboxylic acid, respectively, and $n$ is an integer which, in a preferred embodiment, is large enough so that the molecular weight of the compound as a whole is at least about 300. The polyester resulting from reaction of adipic acid with a mixture of ethylene and propylene glycols is preferred. In the preparation of these polyesters, the glycol is used in at least slight excess so that the polyesters contain terminal hydroxyl groups which are available for reaction with the isocyanates.

Any of a wide variety of organic polyisocyanates (b) may be employed in the reaction, including aromatic, aliphatic and cycloaliphatic diisocyanates and combinations of these types. Representative compounds include aromatic diisocyanates, such as 2,4-tolylene diisocyanate, mixtures thereof with 2,6-tolylene diisocyanate usually in proportions of 80% of the 2,4 isomer and 20% of the 2,6 isomer and referred to herein as mixed isomers of tolylene diisocyanate (80/20:2,4/2,6), 4,4-methylene-bis(phenylisocyanate), and m-phenylene diisocyanate. Aliphatic compounds such as ethylene diisocyanate, ethylidene diisocyanate, propylene-1,2-diisocyanate, butylene-1,3-diisocyanate, tetramethylene diisocyanate, hexamethylene diisocyanate and decamethylene diisocyanate, and alicyclic compounds such as 1,2- and 1,4-cyclohexylene diisocyanates and 4,4'-methylene-bis(cyclohexylisocyanate) are also operable. Arylene diisocyanates, i.e., those in which each of the two isocyanate groups is attached directly to an aromatic ring, react more rapidly with the polymeric glycols than do the alkylene diisocyanates. Compounds such as 2,4-tolylene diisocyanate in which the two isocyanate groups differ in reactivity are particularly desirable. The diisocyanates may contain other substituents, although those which are free from reactive groups other than the two isocyanate groups are ordinarily preferred. In the case of the aromatic compounds the isocyanate groups may be attached either to the same or to different rings. Additional polyisocyanates which may be employed, for example, include: p,p'-diphenylmethane diisocyanate, 3,3'-dimethyl-4,4'-biphenylene diisocyanate, 3,3'-dimethoxy-4,4'-biphenylene diisocyanate, 3,3'-diphenyl-4,4'-biphenylene diisocyanate, 4-chloro-1,3-phenylene diisocyanate, 3,3'-dichloro-4,4'-biphenylene diisocyanate, and 1,5-naphthalene diisocyanate, and other polyisocyanates in a blocked or semi-inactive form such as the bis-phenylcarbamates of tolylene diisocyanate, p,p'-diphenylmethane diisocyanate, p-phenylene diisocyanate, and 1,5-naphthalene and 1,5-tetrahydronaphthalene diisocyanate.

In the preparation of the starting polyurethane polymer (I), an excess of the organic polyisocyanate (b) over the active hydrogen containing compound (a) is used. The ratio of organic polyisocyanate compound (b) to active hydrogen containing compound (a) is preferably such that the NCO/OH ratio is greater than about 1.3:1. While there is no upper limit to the NCO/OH ratio for practical purposes a ratio greater than about 2.75:1 is seldom employed.

The reaction may be effected in the absence of a solvent when the prepolymer (I) is a fluid at processing temperatures. When it is not, or when it is desired to employ a solvent, convenient solvents are inert organic solvents having a boiling range above about 100° C. when the reaction is to be carried out in open equipment. Lower boiling solvents may of course be used where the reaction is carried out in closed equipment to prevent boiling off the solvent at the temperatures of the reaction. Solvents boiling at substantially more than 140° C. are difficult to remove from a final chain-extended elastomer at desirable working temperatures, although it will be obvious that higher boiling solvents may be employed where the excess solvent is removed by means other than by heating or distillation. The solvent, when used, may be added at the beginning, at an intermediate point, or at the end of the prepolymer reaction stage, or after cooling of the formed prepolymer. The solvents to be used are preferably those in which the reactants have some solubility but in which the final chain-extended elastomer is insoluble. Ketones, tertiary alcohols, and esters may be used. The aliphatic hydrocarbon solvents such as the heptanes, octanes and nonanes, or mixtures of such hydrocarbons obtained from naturally occurring petroleum sources such as kerosene, or from synthetically prepared hydrocarbons, may sometimes be employed. Cycloaliphatic hydrocarbons such as methylcyclohexane and aromatic hydrocarbons such as toluene may likewise be used. Toluene and isopropyl acetate are preferred solvents. The amount of solvent used may be varied widely. Any amount of solvent up to about 100 parts of solvent per 100 parts of prepolymer has been found to be operable. The excess solvent, where large amounts are employed, may be separated partially or completely from the polymer prior to emulsification in the water solution. Sometimes the excess solvent is useful and is allowed to remain during the emulsification stage.

The active hydrogen containing compound and the isocyanate are ordinarily reacted by heating with agitation at a temperature of about 50° to 130° C. without a catalyst or at about 25° to 60° C. where a catalyst such as stannous octoate is employed. The reactants are heated for a period sufficient to react most, if not all, of the hydroxy groups, whereafter the prepolymer is allowed to stand and the free NCO content determined. A period of from about 1 to 3 hours is preferred when a catalyst is not employed whereas a period of from about 10 minutes to 3 hours is preferred when a catalyst is employed.

Usual pH's are employed during preparation of the prepolymer, the reaction preferably being maintained substantially neutral. Bases accelerate the reaction, acids retard the reaction, and preferably neither are added.

The chain-extending agent which is used in this invention is a compound containing a plurality of active hydrogen atoms capable of reacting with isocyanates. In the chain extenders useful in this invention, the active hydrogen atoms are preferably attached to oxygen, nitrogen or sulfur. The groups containing the active hydrogen will ordinarily be —OH, —SH, —NH—, —NH$_2$, —COOH, —CONH$_2$, —CONHR where R represents an organic radical, —SO$_2$OH, —SO$_2$NH$_2$, or —CSNH$_2$. The chain-extending compound may be aliphatic, aromatic or cycloaliphatic or of mixed type. Typical of many organic compounds which are useful in this connection are ethylene glycol, hexamethylene glycol, diethylene glycol, adipic acid, terephthalic acid, adipamide, 1,2-ethanedithiol, hydroquinone, monoethanolamine, 4-aminobenzoic acid, m-phenylenediamine, propylenediamine, 4-aminobenzamide, sulfanilamide, aminopropionic acid, 1,4-cyclohexanedisulfonamide, 1,3-propanedisulfonamide, 4-hydroxybenzoic acid, p-aminophenol, ethylenediamine, succinic acid, succinamide, 1,4-butanedisulfonamide, 2,4-tolylenediamine, bis(4-aminophenyl)-methane, beta-hydroxypropionic acid and 1,2-ethanedisulfonic acid. Compounds containing at least one amino group are preferred organic chain extending agents.

Certain of the chain extending agents are considerably more reactive with isocyanates than others and the speed of reaction may be, to some extent, controlled by a suitable choice of extending agent. The amines are particularly reactive agents.

Particularly desirable for this purpose are diamines.

Suitable diamines for carrying out the present process are inter alia aliphatic, cycloaliphatic, aromatic, araliphatic and heterocyclic diamines.

Among the large number of reactive diamines, the following are to be mentioned by way of example:

Dichloro-diamino diphenylmethane
Bis-γ-aminopropyl methylamine
Piperazine
2-methylpiperazine
Guanidine
1-dimethylamino-2,4-diaminobenzene
3,5-diaminobenzene sulphamide
4,4-diamino diphenyl sulphone
2,4-diamino anisidine
Terephthalic acid dihydrazide
5-amino-1,2,3,4-tetrahydroquinoline
Hexamethylenediamine
1,3-diaminobenzene-4-sulphonic acid
1,4-diaminobenzene-3-sulphonic acid
2,6-diaminotoluene-4-sulphonic acid
4,4′-diaminostilbene-2,2′-disulphonic acid
4,4′-diamino-dibenzyl-2,2′-disulphonic acid
Benzidine-2,2′-disulphonic acid
Benzidine-3,3′-disulphonic acid
4,4′-diamino-3,3′-dimethoxy-diphenyl-6,6′-disulphonic acid
4,4′-diamino-2-methyl azobenzene-2′-sulphonic acid
4,4-diamino diphenyl urea disulphonic acid
4,4′-diamino diphenylamine-2-sulphonic acid
2,6-diaminophenol-3-sulphonic acid
4$^1$,4$^2$-diamino triphenyl methane-2$^3$,4$^3$-disulphonic acid
2,4-diamino cinnamic acid
2,5-diamino phenoxy acetic acid
3,5-diamino benzoic acid
3,6-diamino benzoic acid
3,5-diamino benzene-1-carbamide taurine
Diamino acids obtained by adding 2 mols of acrylonitrile to glycol or taurine and subsequent hydrogenation
1,6-hexamethylene diamino-N,N′-diacetic acid and also diamino sulphonic acids which are formed by condensation of several components with formation of amide, urethane, urea or ester, such as, for example, 1,8-bis - (3′-aminobenzamide) - naphthalene-3,6-disulphonic acid.

The amount of water to be employed in the formation of the dispersion is not critical, although, in general, the minimum amount will be equal to the volume of the initial addition product of the solvent solution or slurry of this product. When too small an amount of water is employed, emulsions are obtained which are too thick to handle readily; while, on the other hand, dispersions which are too dilute are uneconomical to handle due to their excessive volume. In general, it is preferred to employ a proportion by weight of polymer (I) to water of from about 1:4 to 2:1.

An emulsifying agent is often desirable although it is not always necessary. Any emulsifying agent or surface active agent which will give oil-in-water emulsions is satisfactory for use in the present invention. Satisfactory types of emulsifying agents are the polyethylene glycol ethers of long chain alcohols; quaternary ammonium salts; the tertiary amine or alkylol amine salts of long chain alkyl acid sulfate esters, alkyl sulfonic acids or alkyl aryl sulfonic acids; and alkali metal salts of high molecular weight organic acids. Nonionic agents are preferred when polymers containing ester groups are emulsified. The pH can then be regulated to a neutral value, preferably not above 7, to minimize any tendency toward hydrolysis. Salts of the high molecular weight organic acids may be used as emulsifying agents. One method of incorporating such salts is to mix the acid, e.g., tall oil, with the prepolymer mass and to have the requisite amount of alkali present in the aqueous bath, so as to form the emulsifier in situ. Although there is presumably some reaction between the acid and the free isocyanate groups in the prepolymer, this is not significant if the mixture is fairly promptly added to the aqueous bath. From about 2% to 6% of the emulsifying agent based on the weight of the prepolymer employed will usually be found sufficient to produce stable emulsions. When a fatty acid soap is used as the emulsifying agent, the soap must not be destroyed by acidic substances. The pH must, therefore, be maintained at least as high as that of an aqueous solution of the soap if stable lactices are to be produced. For most fatty acid soaps the pH should at least 9, and for this reason soaps are not preferred. It should be noted that the small amount of carbon dioxide which may be formed by the chain extension of the isocyanate groups with water is acidic and uses up free alkali in the latex, so that an excess of alkali may be necessary to compensate for this. Preferably, no alkali is added to the reaction, since some usually remains and causes deterioration of the polymer at elevated temperatures.

The amount of chain extender (II) should be sufficient to react with all the free isocyanate groups in polymer (I). For practical purposes the chain extender (II) is preferably employed in amounts to provide an active hydrogen/NCO ratio of from about 0.75:1 to 1.9:1.

In a preferred embodiment of this invention, the chain extender (II) is dissolved in water first, with or without an emulsifying agent, and agitated as needed. This mixture is added to the dispersion of the prepolymer (I) in water. The amount of water to be employed is not critical. The over-all mixture is then dispersed by rapid agitation.

In order to prepare a polyurethane dispersion having the desired film-forming properties and greatly improved mechanical stability in accordance with this invention requires that the mixture of prepolymer (I) and water be at an initial temperature of from about —5 to 20° C. for the dispersion step. Where the mixture is at a temperature between about —5 to 0° C., generally a conventional freezing point depressant such as ethylene glycol, propylene glycol, etc., must be added. Accordingly, a temperature for the mixture of prepolymer (I) and water of from about 0 to 20° C., is preferred.

It is preferred to employ a high shear mixer for the dispersion of prepolymer (I) in water. One example of a high shear mixer is a Colloid Mill which is a well-known device for dispersing or homogenizing. Such a device is disclosed by the Premier Mill Corporation, 224 5th Ave., New York, N.Y., in Bulletin No. 64, entitled Dispersators—Colloid Mills, and particularly on the second page of the bulletin. The term "homogenizer," as used herein, also includes apparatus of the type disclosed and described in U.S. Patent No. 2,619,330 (P. Willems), granted Nov. 25, 1952. In brief, this apparatus comprises two parallel and relatively rotatable discs, two shafts, the discs forming a central chamber between them and being centrally secured to the shafts, one of the shafts being tubular and having arranged within, and serving as a bearing for, the other shaft, a centrifugal pump arranged in said chamber and including propeller blades extending substantially radially and carried by one of the shafts, the propeller blades terminating at a distance from the circumferences of the discs, the discs being provided on their inner faces outside the centrifugal pump area with spaced concentric rows of spacedly and circularly arranged teeth, the teeth of either disc between the teeth of the outermost and innermost rows projecting into the spaces between adjacent rows of teeth of the other disc, the teeth being shaped and arranged to form material-impacting flanks extending generally radially, the spaces between the teeth of the outermost row forming material discharge openings around the entire periphery of the device.

In order to achieve the best results in terms of both film-forming properties and mechanical stability, it is preferred to employ a homogenizer and particularly an ultrasonic homogenizer or a valve homogenizer for the dispersion of polymer (I) in water.

The ultrasonic homogenizer may be described as a liquid whistle and consists essentially in causing a jet of liquid to impinge on a vibratory member so as to produce high frequency vibrations. Such apparatus consists in a jet-form structure to which liquid can be supplied under pressure and having one or more restricted outlets or nozzles which direct the liquid stream against a blade or light vibrator so as to produce acoustic vibrations generally in the ultrasonic range, the jet-form structure and vibrator being mounted so as to be readily introduced into or close to the medium to be treated. The expression "ultrasonic homogenizer," as used herein, refers to the type of device just described.

The valve homogenizer is provided with a surface which cooperates with an adjacent surface formed by a seat in the valve passage and biasing means is employed to urge the valve member against its seat from which it is displaced by the liquid material delivered under pressure by a high pressure pump. The two surfaces are thus held in closely spaced relation during the homogenizing process so that the liquid material is forced through the very narrow passageway thus defined. Depending somewhat on the nature of the product being homogenized and the homogenizing pressure, such displacement of the adjacent surfaces is conventionally restricted to a few thousandths of an inch. Because of the pressures employed in forcing the liquid through this narrow passageway, liquid velocities become extremely high at this point and a shearing action is imparted to the material which breaks up the clumps or agglomerates present and produces a uniform product. Devices of this type may be used as a single stage or single valve or in multiple stages as described in detail below. The expression "valve homogenizer," as used herein, refers to the type of device just described and may include both a single homogenizing valve and a plurality of such valves in succeeding stages.

Figure 2:
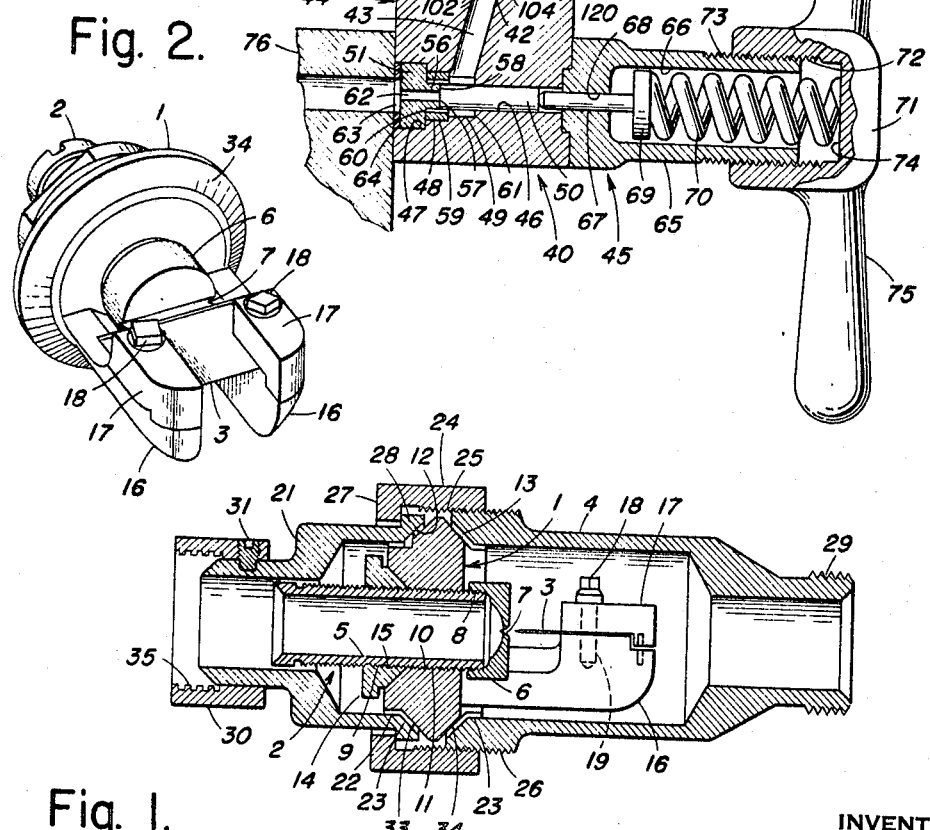
Figure 1:
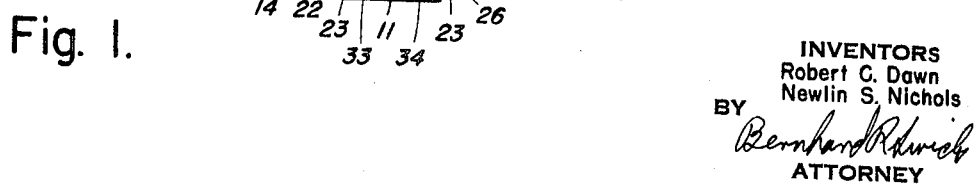

Preferred devices of the types just described are illustrated in the accompanying drawings wherein:

FIGURE 1 is an elevational view principally in section of an ultrasonic homogenizer suitable for use in the process of this invention, FIG. 2 is a three-dimensional view of the inner mechanism of the ultrasonic homogenizer of FIGURE 1, and FIGURE 3 is a cross-sectional view in side elevation of a valve homogenizer suitable for use in the practice of the instant invention.

With reference now more particularly to FIGURES 1 and 2, it will be seen that the ultrasonic homogenizer generally comprises a main body or assembly piece indicated generally at 1, a jet member indicated generally at 2, a thin vibratable blade 3, and a resonant bell 4.

The jet member 2 comprises a threaded hollow cylindrical body portion 5 provided with threads 9 on the outer surface thereof and a nut member 6 provided with a narrow elongated jet aperture 7 shown in cross-section in FIGURE 1. Nut member 6 has internal threads 8 matching the external threads 9 of body portion 5 and is mounted on the end of body portion 5 by engaging the threads 8 of the nut member 7 with the threads 9 of the body portion 5. The body portion 5 in turn is threadedly engaged and mounted in body or assembly piece 1 by the engagement of the external threads 9 of body portion 5 with the internal threads 10 provided in an opening 11 of assembly piece 1. Thus the relative position of jet member 2 may be adjusted within assembly piece 1 by rotation of jet member 2, thereby moving it forward or backward depending upon the direction of the rotation.

A locking collar 14, having internal threads 15 adapted to engage the external threads 9 of jet member 2, is provided whereby upon threading collar 14 up against assembly piece 1 the jet member 2 may be locked in the desired position. In order to readjust jet member 2 it is simply necessary to loosen up on locking collar 14, rotate jet member 2, particularly the body portion 5, in the proper direction to position it where desired and then again tighten up on locking collar 14.

The assembly piece 1 includes a pair of prongs 16 extending to a position where the blade 3 may be positioned directly in front of the aperture 7 of jet member 2, by mounting on the prongs 16. The blade 3 is mounted by means of clamps 17 and a pair of clamp screws 18 which are adapted to be threaded into suitable threaded openings 19 in prongs 16 whereby clamps 17 may clamp the blade 3 by the tightening of clamp screws 18. The two prongs 16 extend out on either side of jet member 2 and only the ends of blade 3 are clamped, leaving the zone immediately in front of the jet open or unblocked except by the blade 3 itself.

The assembly of jet member 2, blade 3 and assembly piece 1 is completely enclosed by means of resonant bell 4 and a member 21, each of which has one end adapted to be connected to a pipe, hose or other fluid conduit and which has an internal diameter on the end opposite the end where such connection is to be made which is larger than the internal diameter of the end for making such connection. These larger diameter ends each have conical surfaces 12 and 13 adapted to mate with conical surfaces 33 and 34 on assembly piece 1 as shown in the drawing. Suitable gaskets 22 and 23 are positioned between the conical surfaces 33 and 34 of assembly piece 1 and the conical surfaces 12 and 13 of member 21 and resonant bell 4. The whole device is assembled as a unit by means of a union nut 24, provided with internal threads 25, adapted to engage threads 26 provided on resonant bell 4. A flange 27 on nut 24 engages a flange 28 on member 21 whereby when the nut 24 is tightened the resonant bell 4 and the member 21 are brought into tight engagement with the conical surface of assembly piece 1.

In one embodiment of this invention the means provided on the resonant bell 4 for connection to suitable conduit means, such as hose or pipe, is an external thread 29 while the means for connection of member 21 to a conduit is a union nut 30 provided with internal threads 35 which may be held in position by means of a lock screw 31.

The operation of the ultrasonic homogenizer is as follows:

The liquid to be homogenized, e.g., mixture of polymer (I) and water which may be provided in any suitable container (not shown) is forced through the ultrasonic homogenizer by suitable means such as a pump which pumps it from the container of the liquid through suitable conduits then through the ultrasonic homogenizer and then through suitable conduits into another container, or where recycling is desired it may be returned to the same container. The liquid to be emulsified passes through the jet member 2 and aperture 7 and leaves the aperture in the form of flat, high-pressure jet stream which impinges on the edge of the blade 3 which then vibrates at its natural frequency, for example, about 22,000 cycles per second. Cavitation takes place continuously in the stream rushing past the blade, causing violent pressure changes to be generated locally. These are immediately put to work in the liquids with virtually no loss of energy and thus a fast, complete emulsification with a minimum temperature rise is achieved.

It is often desirable to premix or pre-emulsify the liquid before homogenization with a conventional high shear mixer such as a Premier Dispersator, followed by treatment with a homogenizer. This device is manufactured by the Premier Mill Corporation, 224 5th Ave., New York, N.Y., and is described in the Premier Mill Corporation Bulletin No. 64, Copyright 1964, entitled Dispersators—Colloid Mills, particularly on the third page under the heading Dispersator. The Duplex Dispersator head shown and described in Bulletin No. 64 is particularly suitable for this purpose. Such premixing reduces the amount of recycling through the homogenizers, such as the sonic or valve homogenizer, which is required and often makes it possible to achieve the desired results with a single pass through the homogenizer.

With reference more particularly to FIGURE 3, the valve homogenizer will be described. While the apparatus shown in FIGURE 3 illustrates a two-stage valve homogenizer, it is to be understood that in some instances a single-stage valve or a valve containing more than two stages may be employed. This apparatus comprises essentially two-valve assemblies indicated generally at 40 and 41, the inlet 42 of valve assembly 41 being directly connected to the outlet 43 of valve assembly 40. Valve assembly 40 comprises a valve body 44 and a valve biasing assembly 45 suitably affixed to valve body 44 by means such as bolts or screws (not shown) which are threaded into the valve body 44. The valve body 44 is provided with a horizontal bore 46 extending through it, the left-hand end of the bore, as shown in drawing, being enlarged by a series of inwardly stepped concentric counterbores 47, 48, and 49. A variable position valve member or plunger 50 is disposed in bore 46 for axial reciprocation therein, one portion of the plunger extending into the enlarged chamber formed by the recesses or counterbores for cooperation with a replaceable annular valve seat 51. The plunger is thus disposed on the downstream side of the valve seat and is normally free to be moved out of seating engagement by the flow of liquid through the valve.

Valve seat 51 is press-fitted into peripheral engagement with the wall of counterbore 47 and is provided with an upstanding collar or boss 56 against whose surface 57 the surface 58 of plunger 50 is adapted to abut. Homogenization is effected when the liquid is forced between these surfaces. In the annular space closely surrounding the collar or boss 56 there is provided a breaker or impact ring 59 which closely surrounds the end of plunger 50. This provides a relatively narrow annular passageway 60 through which liquid may pass up to the larger annular chamber 61 formed by the recess or counterbore 49 and plunger 50. The impact of the liquid upon striking the impact ring 59 and turning abruptly on emerging between surfaces 57 and 58 produces further homogenizing action. It will be noted that the valve seat 51 has an axial bore or orifice 62 which is substantially in coaxial alignment with the inlet 63 to the valve. Liquid thus passes up through the orifice or bore 62 in the valve seat to the under surface 58 of plunger 50 and in between that surface and the mating surface 57 of valve seat 51 upon displacement of the plunger 50 against the pressure of the biasing assembly 45. A suitable gasket or ring 64 is provided in direct contact with the inner surface of counterbore 47 and having an opening of sufficient size to provide an inlet for the valve.

To develop the high pressure necessary for homogenization, plunger 50 is resiliently held against its seat 51 by the biasing means 45. Biasing means 45 comprises a body portion 65 having a relatively large diameter bore 66 provided in a major portion thereof and having a relatively small diameter bore 68 coaxial with the large diameter bore extending through the remainder of the body 65. A variable position plunger 67 is disposed in bore 66 for axial reciprocation therein, one end of the plunger extending through bore 68 into the bore 46 of the valve body 44 and into contact with plunger 50. The opposite end of plunger 67 is provided with a wide flange 69 of a diameter slightly less than the diameter of bore 66. A biasing spring 70 is provided within bore 66 and in contact with flange 69. Spring 70 is compressed by a nut member 71, having internal threads 72 adapted to engage threads 73 on the outside of body 65, said nut being closed at one end whereby the end of spring 70 opposite that engaging flange 69 is contacted by the inside surface 74 of the closed end of nut 71. Thus by rotating nut 71 in a direction to travel toward the valve body 44, spring 70 is compressed thus increasing the bias on plunger 50; and by rotating the nut 71 in the opposite direction, the compression on spring 70 is loosened thus decreasing the bias on the valve and thus the bias on the valve and the degree of homogenization may be controlled by controlling the position of nut 71. A suitable handle 75 is provided on nut 71 to facilitate adjustment of the compression on spring 70.

The second-stage valve assembly 41 is substantially identical to the first-stage valve assembly 40 and, accordingly, will not be discussed in as much detail. Valve assembly 41 is mounted on valve assembly 40 whereby the inlet 42 of valve assembly 41 coincides with the outlet 43 of valve assembly 40. The two valves are joined together by suitable means such as screws or bolts (not shown). By properly machining the two mating surfaces of the valve bodies 44 and 84, leakage between the valve bodies may be prevented. In lieu of this, a gasket (not shown) may be provided between the two surfaces. Valve assembly 41, like valve assembly 40, comprises a valve body 84 and a biasing assembly 85. Valve body 84 has a bore 86 and counterbores 87, 88, and 89. A vertical plunger 90 is provided within bore 86 and a valve seat 91 is provided for contact with plunger 90. This valve seat is press-fitted into peripheral engagement with the wall of counterbore 87 and is provided with a boss 96. Mating surfaces 97 and 98 of valve seat 91 and plunger 90 are provided to contact each other. An impact ring 99 is employed to provide a passageway 100 for the fluid to a larger annular chamber 101. A suitable bore 102 is provided in valve seat 90. A gasket 104 is provided at the inlet of the valve.

The biasing assembly 85 comprises a body 105 having a large bore 106 through a major portion thereof and a small bore 108 through the remaining portion, a plunger 107 adapted to reciprocate within bore 108 and to contact the plunger 90 to bias the position of plunger 90. The opposite end of plunger 107 is provided with a flange 109 which engages one end of a spring 110, the other end of which spring is engaged by a nut 111 which is provided with internal threads 112 adapted to engage external threads 113 on body 105. Nut 111 is provided with a suitable handle 115. The operation of valve assembly 41 is substantially identical to that of valve assembly 40 and, accordingly, need not be described.

Means are provided for connecting the outlet 83 of valve assembly 41 to a suitable conduit 118 which may comprise a union nut 116 and a gasket 117, nut 116 having internal threads 119 engaging external threads 120, at the outlet of valve assembly 41.

As shown in FIGURE 3, the inlet for valve assembly 40 is mounted directly on the outlet of a pump 76 by means of screws, bolts, or other means. By suitable machining of the mating surfaces or by the provision of gaskets, leakage is prevented. In lieu of mounting directly on pump 76 the body 44 could be provided with an extension similar to that shown on valve assembly 41 having external threads, and a suitable union or other device similar to that for valve 41 may be provided for connecting valve 40 to a conduit. In any event homogenization is carried out in a manner substantially the same as that described above in connection with the ultrasonic homogenizer of FIGURES 1 and 2, namely, the liquid being homogenized is pumped from a reservoir or container through the homogenizing valve or valves into another container or where desired, returned to the original reservoir or container for recycling by means of suitable conduits. As with the ultrasonic homogenizer, a premixing or pre-emulsification step may be employed prior to passing the liquid through the homogenizer.

Ultrasonic homogenizers and valve homogenizers of the type just described and shown in FIGURES 1, 2, and 3 are readily available on the market. The size of the homogenizer and the amount of recirculation of the material through the homogenizer, if any, depends on the amount and kind of material being dispersed and may be readily determined by one skilled in the art.

The following examples are given to illustrate the invention:

EXAMPLE I (a) Prepolymer formation 1,000 grams of polyoxypropylene glycol of molecular weight averaging 1,000 were added to 348 grams of mixed isomers of tolylene diisocyanate (80/20:2,4/2,6). The NCO/OH mol ratio was 2:1. The mixture was heated at 100° C. for 3 hours.

(b) Chain extension 1,000 grams of the prepolymer were dissolved in 300 grams of toluene. This mixture along with 740 grams of aqueous surface active agent solution containing 5.4% by weight of the surface active agent consisting of dihydric polyoxyethylene-polyoxypropylenes having a molecular weight of about 16,000, a molecular weight of the polyoxypropylene base of about 3,250 and a polyoxyethylene content of about 80% by weight were pre-cooled to 5° C. The solutions were pre-emulsified with a Premier Dispersator, of the type described above, for 2 minutes. The pre-emulsion was subsequently fed into an ultrasonic homogenizer, of the type described above, operating at a rate of 2 g.p.m.

A separate aqueous chain extender solution was then prepared by dissolving 191 grams of dichloro-diamino diphenyl methane in 20 parts of toluene and 40 parts of water. This mixture was heated to 70° C., agitated for 10 minutes with a conventional propeller-type agitator after which the temperature was 70° C. and then added for a period of several minutes to the prepolymer dispersion with agitation by a conventional propeller mixer during the addition. A mechanically stable polyurethane emulsion was formed as evidenced by the fact that the emulsion showed no sign of separation after standing for one week.

EXAMPLE II

A procedure substantially the same as Example I was employed with the exception that the prepolymer was dissolved in 40 parts of toluene for 100 parts of prepolymer and that 97 grams of hexamethylene diamine was employed as a chain extender in lieu of dichloro-diamino diphenyl methane. The hexamethylene diamine was dissolved in 40 parts of water per 100 parts of polymer and cooled to 5° C. before adding to the pre-emulsion. A mechanically stable polyurethane emulsion was formed as evidenced by the fact that the emulsion on standing showed no sign of separation after standing for one week.

EXAMPLE III (a) Prepolymer formation 750 grams of polyoxypropylene glycol of molecular weight averaging 750 were added to 500 grams of diphenyl methane diisocyanate. The NCO/OH ratio was 2:1. The mixture was heated at 95° C. for 2 hours.

(b) Chain extension 1,000 grams of the prepolymer were dissolved in 400 grams of toluene. This mixture along with 760 grams of aqueous surface active agent solution containing 7.9% by weight of the surface active agent consisting of dihydric polyoxyethylene-polyoxypropylenes having a molecular weight of about 16,000, a molecular weight of the polyoxypropylene base of about 3,250 and a polyoxyethylene content of about 80% by weight were pre-cooled to 5° C. The solutions were then pre-emulsified with Premier Dispersator as in Example I for 2 minutes. The pre-emulsion was subsequently fed through an ultrasonic homogenizer of the type described above, operating at 2 g.p.m. A separate aqueous chain extender solution was then prepared by dissolving 76 grams of 2-methylpiperazine in 400 grams of water, cooling to 5° C. and agitating for 5 minutes with a commercial propeller-type agitator after which the temperature was 8° C. to 10° C. This solution was then cooled to approximately 5° C. and added to the prepolymer dispersion with agitation by a conventional propeller-type mixer during the addition.

A mechanically stable polyurethane emulsion was formed as evidenced by the fact that the emulsion showed no sign of separation after standing for one week.

EXAMPLE IV 1,000 grams of an adipate polyester-diphenyl methane diisocyanate prepolymer of molecular weight averaging 1,200 having an NCO/OH mol ratio of 2:1 were dissolved in 400 grams of toluene. This mixture along with 740 grams of aqueous surface active agent solution containing 5.4% by weight of the surface active agent consisting of dihydric polyoxyethylene-polyoxypropylenes having a molecular weight of about 16,000, a molecular weight of the polyoxypropylene base of about 3,250 and a polyoxyethylene content of about 80% by weight were pre-cooled to 5° C. The solutions were then pre-emulsified with a Premier Dispersator, as set forth in Example I, for 2 minutes and subsequently fed through an ultrasonic homogenizer of the type described above operating at 2 g.p.m. A separate aqueous chain extender solution was then prepared by dissolving 76 grams of 2-methylpiperazine in 400 grams of water and then added to the prepolymer dispersion with agitation by a conventional propeller-type agitator during the addition. A mechanically stable polyurethane emulsion was formed as evidenced by the fact that the emulsion showed no sign of separation after standing for one week.

EXAMPLE V

A procedure substantially the same as that of Example IV was employed with the exception that piperazine was employed as the chain extender instead of the 2-methylpiperazine. A mechanically stable polyurethane emulsion was formed.

EXAMPLE VI

(a) Prepolymer formation 675 grams of polyoxypropylene glycol of molecular weight averaging 675 were added to 261 grams of mixed isomers of toluene diisocyanate (80/20:2,4/2,6). The NCO/OH mol ratio was 1.5:1. The mixture was heated at 45° C. for 2 hours in the presence of 0.12 gram of stannous octoate.

(b) Chain extension 1,200 grams of the prepolymer were dissolved in 600 grams of toluene. This mixture along with 912 grams of aqueous surface active agent solution containing 4.0% by weight of the surface active agent consisting of dihydric polyoxyethylene-polyoxy-propylenes having a molecular weight of about 16,000, a molecular weight of the polyoxypropylene base of about 3,250 and a polyoxyethylene content of about 80% by weight and 4.0% by weight of an alkyl aryl polyether alcohol surface active agent were pre-cooled to 5° C. The solutions were then pre-emulsified with a Premier Dispersator as in Example I for 2 minutes. A separate aqueous chain extender solution was then prepared by dissolving 92 grams of 2-methylpiperazine in 480 parts of water. The prepolymer and surfactant solutions were cooled to about 5° C. and then pre-emulsified with a Premier Dispersator as in Example I after which complete emulsification was effected by feeding through an ultrasonic homogenizer of the type described above. The chain extender solution was then added to the prepolymer dispersion with agitation by a conventional propeller mixer during the addition. A mechanically stable polyurethane emulsion was formed as evidenced by the fact that the emulsion showed no sign of separation after standing for one month.

EXAMPLE VII

A procedure substantially the same as Example VI was employed with the exception that a different combination of surface active agents was employed. The surface active agent solutions prepared for this example contained 3 parts of the polyoxyethylene-polyoxypropylene surface active agent of the previous examples and 3 parts of a lauryl alcohol sulfate anionic surface active agent per 100 parts of the prepolymer. A mechanically stable polyurethane emulsion was formed as evidenced by the fact that the emulsion showed no sign of separation after standing for 1 month.

EXAMPLE VIII

A method substantially the same as Example VI was employed with the exception that a different combination of surface active agents was employed. The surface active agent solutions employed for this example contained 3 parts of the polyoxyethylene-polyoxypropylene surface active agent and 3 parts of a dioctyl ester of sodium sulfosuccinic acid anionic surface active agent per 100 parts of prepolymer. A mechanically stable polyurethane emulsion was formed as evidenced by the fact that the emulsion showed no sign of separation after standing for 1 month.

EXAMPLE IX

A method which is substantially the same as that of Example VI was employed except that a different surface active agent was used. The surface active agent used in this example contained 3 parts of sodium lauryl sulfate anionic surface active agent per 100 parts of the prepolymer. A mechanically stable polyurethane emulsion was formed as evidenced by the fact that the emulsion showed no sign of separation after standing for 1 month.

EXAMPLE X

A method substantially the same as that of Example VI was used except that the surface active agent combination was different. The surface active agent solution employed in this example contained 3 parts of an alkyl aryl polyether alcohol surface active agent and 2 parts of sodium lauryl sulfate anionic surface active agent per 100 parts of the prepolymer. A mechanically stable polyurethane emulsion was formed as evidenced by the fact that the emulsion showed no sign of separation after standing for 1 month.

EXAMPLE XI

(a) Prepolymer formation 2,000 grams of polyoxypropylene glycol of molecular weight averaging 2,000 were added to 720 grams of mixed isomers of toluene diisocyanate (80/20:2,4/2,6). The NCO/OH mol ratio was 2.75:1. The mixture was heated at 100° C. for 3 hours.

(b) Chain extension 1,200 grams of the prepolymer were dissolved in 480 grams of toluene. This mixture along with 888 grams of aqueous surface active agent solution containing 5.4% by weight of the surface active agent consisting of dihydric polyoxyethylene-polyoxypropylenes having a molecular weight of about 16,000, a molecular weight of a polyoxypropylene base of about 3,250 and a polyoxyethylene content of about 80% by weight were cooled to 5° C. The solutions were then pre-emulsified with a Premier Dispersator as in Example 1 for 2 minutes and subsequently fed through an ultrasonic homogenizer of the type described above, operating at 2 g.p.m.

A separate chain extender solution was then prepared by dissolving 80 grams of 2-methylpiperazine in 480 grams of water. This chain extender solution was pre-cooled to 5° C. and then added to the prepolymer dispersion with agitation by a conventional propeller mixer during the addition. A mechanically stable polyurethane emulsion was formed as evidenced by the fact that the emulsion showed no sign of separation after agitation for 20 minutes with a high shear mixer.

EXAMPLE XII

The method substantially the same as Example XI was employed with the exception that the prepolymer was prepared from 1,250 grams of polyoxypropylene glycol of a molecular weight averaging 1,250 and 435 grams of the toluene diisocyanate. This gave an NCO/OH ratio of 2.5:1. A mechanically stable polyurethane emulsion was formed as evidenced by the fact that the emulsion showed no sign of separation after agitation for 20 minutes with a high shear mixer.

EXAMPLE XIII

The method substantially the same as Example XI was employed with the exception that 1,250 grams of the polypropylene glycol and 392 grams of toluene diisocyanate were employed providing an NCO/OH ratio of 2.25:1 and that 6 parts of the surface active agent per 100 parts of the prepolymer were employed in lieu of 4 parts per 100 parts of prepolymer. A mechanically stable polyurethane emulsion was formed.

EXAMPLE XIV (a) Prepolymer formation 750 grams of polyoxypropylene glycol of molecular weight averaging 750 were added to 305 grams of mixed isomers of toluene diisocyanate (80/20:2,4/2,6). The NCO/OH mol ratio was 1.75:1. The mixture was heated at 100° C. for 3 hours.

(b) Chain extension 200 grams of the prepolymer were dissolved in 100 grams of toluene (equal to 50 parts toluene per 100 parts of prepolymer). This mixture along with 142 grams of aqueous surface active agent solution containing 8.5% by weight of the surface active agent consisting of dihydric polyoxyethylene-polyoxypropylenes having a molecular weight of about 11,250, a molecular weight of the polyoxypropylene base of about 2,250 and a polyoxyethylene content of about 80% by weight were cooled to 5° C. The solutions were then pre-emulsified with a Premier Dispersator as in Example I for 2 minutes and subsequently fed at a rate of 0.2 g.p.m. through a valve homogenizer of the type described above and shown in the drawings, operated at a pressure of 7,000 p.s.i. A separate aqueous chain extender solution was then prepared by dissolving 13 grams of 2-methylpiperazine in 70 grams of water. The chain extender solution was pre-cooled to 5° C. and added to the prepolymer dispersion with rapid agitation by a conventional propeller mixer during the addition. A mechanically stable polyurethane emulsion was formed as evidenced by the fact that the emulsion showed no sign of separation after standing for 1 month.

EXAMPLE XV

The method of Example XIV was employed with the exception that the surface active agent consisted of dihydric polyoxyethylenepolyoxypropylenes having a molecular weight of about 16,000, a molecular weight of the polyoxypropylene base of about 3,250 and a polyoxyethylene content of about 80% by weight and the agitation with the valve homogenizer was carried out at a homogenizer pressure of 1,000 p.s.i. and at 0.3 g.p.m. A mechanically stable polyurethane emulsion was formed as evidenced by the fact that the emulsion showed no sign of separation after standing for 1 month.

EXAMPLE XVI

The method substantially the same as Example XIV was employed with the exception that 348 grams of toluene diisocyanate were employed giving an NCO/OH ratio of 2:1 and the proportions of toluene and prepolymer were 40 parts of toluene per 100 parts prepolymer and the valve homogenizer was operated at 1,000 p.s.i. A mechanically stable polyurethane emulsion was obtained.

EXAMPLE XVII (a) Prepolymer formation 675 grams of polyoxypropylene glycol of molecular weight averaging 675 were added to 261 grams of mixed isomers of toluene diisocyanate (80/20:2,4/2,6). The NCO/OH mol ratio was 1.5:1. The mixture was heated at 45° C. for 2 hours in the presence of 0.12 gram stannous octoate.

(b) Chain extension 1,200 grams of the prepolymer were dissolved in 600 grams of toluene. This mixture along with 888 grams of aqueous surface active agent solution containing 5.4% by weight of the surface active agent consisting of dihydric polyoxyethylene-polyoxypropylenes having a molecular weight of about 16,000, a molecular weight of a polyoxypropylene base of about 3,250 and a polyoxyethylene content of about 80% by weight were cooled to 5° C. The solutions were then pre-emulsified with a Premier Dispersator as in Example I for 2 minutes and subsequently fed through an ultrasonic homogenizer of the type described above. A separate aqueous chain extender solution was then prepared by dissolving 78 grams of 1,4-cyclohexane-bis-methylamine in 480 grams of water. This solution, which was pre-cooled to 5° C., was added to the prepolymer dispersion with agitation by a conventional propeller-type mixer during the addition. A mechanically stable polyurethane emulsion was formed as evidenced by the fact that the emulsion showed no sign of separation after standing for 1 month.

EXAMPLE XVIII

A procedure substantially the same as that of Example XVII is employed with the exception that the chain extender was a 2-hydroxypropyl-ethylene diamine and was employed in the amount of 35 grams. A mechanically stable polyurethane emulsion was formed as evidenced by the fact that the emulsion showed no sign of separation after agitation for 20 minutes with a high shear agitator.

EXAMPLE XIX

A procedure substantially the same as Example XVII was employed with the exception that the chain extender employed was dodecahydro-1479B-tetraazaphenalene and was employed in the amount of 67 grams. A mechanically stable polyurethane emulsion was formed as evidenced by the fact that the emulsion showed no sign of separation after standing 1 month.

EXAMPLE XX (a) Prepolymer formation 675 grams of polyoxypropylene glycol of molecular weight averaging 675 was added to 261 grams of mixed isomers of toluene diisocyanate (80/20:2,4/2,6). The NCO/OH mol ratio was 1.5:1. The mixture was heated at 45° C. for 2 hours in the presence of 0.12 gram stannous octoate.

(b) Chain extension 1,200 grams of the prepolymer were dissolved in 480 grams of toluene. This mixture along with 888 grams of aqueous surface active agent solution containing 5.4% by weight of the surface active agent consisting of dihydric polyoxyethylene-polyoxypropylenes having a molecular weight of about 16,000, a molecular weight of the polyoxypropylene base of about 3,250 and a polyoxyethylene content of about 80% by weight were pre-cooled to 5° C. The solutions were then pre-emulsified with a Premier Dispersator as in Example I for 2 minutes. The pre-emulsion was subsequently fed through an ultrasonic homogenizer of the type described above, operating at 2 g.p.m.

A separate aqueous chain extender solution was then prepared by dissolving 52 grams of butane diol in 480 grams of water. This solution was cooled to 5° C. The chain extender solution was then added to the prepolymer dispersion with agitation by a conventional propeller-type mixer during the addition. A mechanically stable polyurethane emulsion was formed as evidenced by the fact that the emulsion showed no sign of separation after standing for 1 week.

EXAMPLE XXI

A procedure substantially the same as that of Example XX was employed with the exception that the chain extender is a xylene diol in the amount of 80 grams dissolved in 480 grams of water. A mechanically stable polyurethane emulsion was formed as evidenced by the fact that the emulsion showed no sign of separation after standing for 1 week.

EXAMPLE XXII

(a) Prepolymer formation

Twelve pounds of a 650 molecular weight polyoxypropylene glycol and 126 pounds of a 1,300 molecular weight polyoxypropylene glycol were added to a reactor to provide a polyoxypropylene glycol composition having an average molecular weight of 1,200. Forty pounds of toluene diisocyanate (80/20:2,4/2,6) and 18 pounds of toluene were added and the mixture reacted for a total of 6 hours at 78° C. to 85° C. The resulting prepolymer contained an unreacted NCO content of 4.85 weight percent. After cooling an additional 53 pounds of toluene was added after which the unreacted NCO content was 3.80 weight percent.

(b) Chain extension

An aqueous surface active agent solution was prepared containing 3 parts by weight of a surface active agent and 70 parts by weight deionized water. The surface active agent consisted of dihydric polyoxyethylene-polyoxypropylenes having a total molecular weight of about 16,000, a molecular weight of the polyoxypropylene base of about 3,250 and a polyoxyethylene content of about 80% by weight. 1,680 grams of the above prepolymer-toluene solution and 876 grams of the surfactant solution were each cooled to 18° C. The prepolymer solution was pre-emulsified with a Premier Dispersator and the surface active agent solution added slowly with agitation by the Premier Dispersator, the total agitation time being 2 minutes. This pre-emulsion was then fed at a rate of ¼ g.p.m. through a valve homogenizer of the type described above, operated at a pressure of 1,000 p.s.i. The homogenizer employed was a Gaulin Laboratory Homogenizer, Type 15M 8BA SMD, manufactured by the Manton-Gaulin Manufacturing Company, Inc., Everett, Mass.

A separate aqueous chain extender solution was prepared by dissolving sufficient 2-methylpiperazine in deionized water to provide an aqueous solution containing 15% by weight 2-methylpiperazine. 378 grams of the 2-methylpiperazine aqueous solution was cooled to 18° C. and added over a period of about 30 seconds to 2,130 grams of the above-described prepolymer emulsion in a container with moderate agitation by means of a conventional turbine-blade laboratory mixer. Agitation was continued for 3 minutes.

After aging overnight, the crude dispersion was stripped of the toluene solvent and part of the water. The toluene content was reduced from about 16% to a range of 2 to 4% by weight. The solids content was adjusted to approximately 50% by weight by slowly adding deionized water with moderate agitation with a conventional propeller agitator.

The dispersion was then subjected to a film-forming test wherein a 0.025″ thick plastic frame was placed on a sheet of glass, held in position with masking tape and a portion of the dispersion then poured into the space within the frame whereby the frame forms a dam for the latex, the amount of dispersion being slightly in excess of an amount necessary to fill the area defined by the frame. A glass rod was then positioned transverse to the longest dimension of the frame at one end of the frame and moved across the length of the frame to create a small pool of latex which is essentially the thickness of the dam wherein the excess material was forced off by the glass rod, after which the material being tested was allowed to dry in a levelled rack.

An excellent film was produced characterized by a complete absence of cracks. The emulsion produced was mechanically stable as evidenced by the fact that the emulsion showed no sign of separation after standing for 4½ months.

EXAMPLE XXIII

A procedure substantially the same as Example XXII was employed with the exception that the pre-emulsion was fed through a Colloid Mill, a well-known device for carrying out dispersions at a rate of ½ g.p.m. and with a clearance setting of 0.040″ in lieu of a valve homogenizer. The Colloid Mill employed in this example was a Gaulin Type 2AB, manufactured by the Manton-Gaulin Manufacturing Company, Inc., Everett, Mass.

The emulsion produced was mechanically stable as evidenced by the fact that the emulsion showed no sign of separation after standing for 5½ months. This polyurethane emulsion was stripped and tested for film-forming properties in the manner described in Example XXII. An excellent crack-free film was obtained.

EXAMPLE XXIV

(a) Prepolymer formation 28 pounds of a 675 molecular weight polyol adduct of propylene oxide and bisphenol-A and 61 pounds of a 3,000 molecular weight polyol adduct of propylene oxide and glycerol were added to a reactor followed by the addition of 26 pounds of toluene diisocyanate and 46 pounds of toluene. This mixture was reacted with agitation at a temperature of 80° C. for 1 hour. After cooling and holding overnight, 5.6 ml. of stannous octoate was added and thoroughly mixed. The reactor was then heated with agitation to 45° C. for a one-hour reaction period. Then 3.6 pounds of isooctyl phenyl polyethoxyethanol were added and agitated for 30 minutes and then cooled. The resulting prepolymer contained an unreacted NCO content of 3.35% by weight.

(b) Chain extension

The chain extension step was substantially the same as that of Example XXII with the exception that the surface active agent solution employed was sodium lauryl sulfate in lieu of the dihydric polyoxyethylene-polyoxypropylenes, 459 grams of the chain extender solution were employed which consisted of 100% morpholine dissolved in a 10% by weight 2-methylpiperazine solution in water to give a mol ratio of morpholine to 2-methylpiperazine of 15:80 and each solution was cooled to 5° C. rather than 18° C.

The emulsion produced was mechanically stable as evidenced by the fact that the emulsion showed no sign of separation after standing for 1½ months. This polyurethane emulsion was stripped and tested for film-forming properties in the manner described in Example XXII. An excellent crack-free film was obtained.

The following examples illustrate the importance of maintaining the temperature below 20° C. prior to dispersion.

EXAMPLE XXV

Three dispersions, referred to in this example by the letters A, B, and C, were prepared from the prepolymer-toluene solution described in part (a) of Example XXII. Each dispersion employed 1,680 grams of the prepolymer-toluene solution and 876 grams of the aqueous surface active agent solution described in Example XXII. In preparing dispersion A, the prepolymer-toluene solution and the surface active agent solution were pre-cooled to 5° C. For dispersion B, the prepolymer-toluene solution and the surface active agent solution were each cooled to 18° C. Dispersion C was prepared from prepolymer and surface active agent solutions which were at a temperature of 25° C. In each case the prepolymer solution was pre-emulsified with a Premier Dispersator and the surface active agent solution added slowly with agitation by the Premier Dispersator, the total agitation time being 2 minutes. This pre-emulsion was then fed through an ultrasonic homogenizer, such as described above, at a rate of 1 g.p.m. and 400 p.s.i. pressure. The ultrasonic homogenizer employed was the "Rapisonic" Model No. R.J.–162, manufactured by the Sonic Engineering Corporation, Norwalk, Conn.

A separate aqueous chain extender solution was prepared by dissolving a sufficient amount of 2-methylpiperazine in water to provide an aqueous solution containing 15% by weight of 2-methylpiperazine. 381 grams of this aqueous chain extender solution were added over a period of about 30 seconds to 2,130 grams of the above-described prepolymer dispersion in a container with moderate agitation by means of a conventional turbine-blade laboratory mixer. Agitation was continued for 3 minutes. The aqueous chain extender solution was cooled to 5° C. prior to addition to the prepolymer for dispersion A, 18° C. for dispersion B, and was at a temperature of about 25° C. prior to addition of the prepolymer for dispersion C.

Dispersions A, B, and C were mechanically stable as evidenced by the fact that there was no sign of separation after standing for 5½ months. Each of these dispersions was stripped and tested for film-forming properties in the manner described in Example XXII. Excellent crack-free films were obtained from dispersions A and B. Dispersion C, i.e., the dispersion where all the components were at 25° C., produced a film which exhibited a substantial amount of cracking and was therefore unsatisfactory.

EXAMPLE XXVI

Three dispersions, referred to in this example by the letters A, B, and C, were prepared from the prepolymer-toluene solution described in part (a) of Example XXIV. Each dispersion employed 3,500 grams of the above prepolymer-toluene solution and 1,825 grams of an aqueous surface active agent solution containing 3 parts by weight of sodium lauryl sulfate and 70 parts by weight water. In preparing dispersion A, the prepolymer-toluene solution was cooled to 5° C. and the surface active agent solution was cooled to 9° C. For dispersion B, the prepolymer-toluene solution and the surface active agent solution were each cooled to 18° C. Dispersion C was prepared from prepolymer and surface active agent solutions at a temperature of 25° C. In each case the prepolymer solution was then agitated by a device of the type disclosed in U.S. Patent No. 2,619,330 FIGURES 1 and 2 for 2 minutes in a 5-gallon container. The inner disc of this device is 3¾" in diameter and is rotated at a peripheral speed of 3,400 feet per minute. The device employed is sold under the name "Polytron" Model 115 TE by Bronwill Scientific Company of Rochester, N.Y.

A separate aqueous chain extender solution was prepared of similar composition to that employed in part (b) of Example XXIV. 1,146 grams of this aqueous chain extender solution were added over a period of about 30 seconds to 5,325 grams of the above-described prepolymer dispersion in a container with moderate agitation by means of a conventional turbine-blade laboratory mixer. Agitation was continued for 3 minutes. The aqueous chain extender solution was cooled to 5° C. prior to adding to the prepolymer dispersion A, 18° C. for prepolymer dispersion B, and was at a temperature of about 25° C. prior to addition to the prepolymer dispersion C. Dispersion C coagulated immediately and was not suitable for producing a film. Dispersions A and B were mechanically stable as evidenced by the fact that there was no sign of separation after standing for 1½ months. Dispersions A and B were stripped and tested for film-forming properties in the manner described in Example XXII. Excellent crack-free films were obtained from each of these two dispersions.

EXAMPLE XXVII

Two dispersions, referred to in this example by the letters A and B, were prepared from the prepolymer-toluene solution described in part (a) of Example XXIV. Each dispersion employed 1,680 grams of the above prepolymer-toluene solution and 876 grams of an aqueous surface active agent solution containing 3 parts by weight of sodium lauryl sulfate and 70 parts by weight water. In preparing dispersion A, the prepolymer-toluene solution was cooled to 5° C. and the surface active agent solution was cooled to 11.5° C. Dispersion B was prepared from prepolymer and surface active agent solutions which were at a temperature of 25° C. In each case the prepolymer solution was pre-emulsified with a Premier Dispersator as described above and the surface active agent solution added slowly with agitation by the Premier Dispersator, the total agitation time being 2 minutes. This pre-emulsion was then fed through a Gaulin Type 2AB "Colloid Mill," such as described above, at a setting of 0.040" clearance.

A separate aqueous chain extender solution was prepared which consisted of a sufficient amount of 100% morpholine dissolved in a 10% by weight 2-methylpiperazine solution in water to give a mol ratio of 80 parts of 2-methylpiperazine to 15 parts morpholine.

459 grams of this aqueous chain extender solution were added over a period of about 30 seconds to 2,130 grams of the above-described prepolymer dispersion in a container with moderate agitation by means of a conventional turbine-blade laboratory mixer. Agitation was continued for 3 minutes. The aqueous chain extender solution was cooled to 5° C. prior to addition to the prepolymer for dispersion A, and was at a temperature of about 25° C. prior to addition to the prepolymer for the dispersion B. Dispersion B coagulated immediately and was not suitable for producing a film. Dispersion A was mechanically stable as evidenced by the fact that there was no sign of separation after standing for 1½ months. Dispersion A was stripped and tested for film-forming properties in the manner described in Example XXII. Excellent crack-free films were obtained from this dispersion.

EXAMPLE XXVIII

This example illustrates the practice of the instant invention on a larger scale than the previous examples.

Two different polyurethane polymers were prepared from two different prepolymers referred to in this example by the numbers 1 and 2.

Prepolymer No. 1 is a reaction product of tolylene diisocyanate with a mixture of 1,200 molecular weight polyoxypropylene glycol and 675 molecular weight polyoxypropylene glycol in a proportion of 1 part by weight 675 molecular weight glycol and 10 parts by weight 1,200 molecular weight glycol, the prepolymer having an NCO:OH ratio of 2:1.

Prepolymer No. 2 is a reaction product of tolylene diisocyanate with a mixture of propylene oxide polyols having an average molecular weight of about 1,500 with an NCO:OH ratio of 2:1.

Two dispersions employing the method of the instant invention were prepared by continuously adding a total of 150 pounds of a prepolymer-toluene solution containing 100 parts prepolymer and 40 parts toluene along with 78 pounds of aqueous surface active agent solution containing 3 parts by weight surfactant to 70 parts by weight water to a 7-gallon pre-dispersion tank.

The surface active agent employed with prepolymer No. 1 consisted of dihydric polyoxyethylene-polyoxypropylenes having a total molecular weight of about 16,000, a molecular weight of the polyoxypropylene base of about 3,250 and a polyoxyethylene content of about 80% by weight, and the surface active agent employed with prepolymer No. 2 was sodium lauryl sulfate.

The prepolymer solutions and polyoxyalkylene surface active agent solution were pre-cooled to 5–8° C. and the sodium lauryl sulfate solution pre-cooled to 18° C. and the prepolymer and surface active agent solutions fed continuously to the 7-gallon pre-dispersion tank where they were continuously pre-emulsified with a Premier Dispersator of the type described above and then fed continuously through an ultrasonic homogenizer of the type described above, operating at a rate of 1 to 2 g.p.m. and discharged continuously into a 10-gallon chain extension tank.

A separate aqueous chain extender solution was prepared by dissolving 10 parts by weight of 2-methylpiperazine in 90 parts by weight of water for chain extending prepolymer No. 1 while a different chain extender solution was prepared by dissolving in 100 parts of the solution just described, 3.26 parts by weight morpholine for chain extending prepolymer No. 2.

The chain extender mixtures were cooled to 3.5–10° C. and then added continuously to the chain extension tank while the homogenized prepolymer emulsion was also being added continuously to the chain extension tank with agitation by a conventional propeller mixer.

A total of 65 pounds of chain extender solution was added continuously to prepolymer No. 1 and a total of 50 pounds of chain extender solution was added continuously to the chain extension tank for prepolymer No. 2; the total production times as a continuous operation with the amounts of the material set forth above being about 25 minutes with the dispersion made from prepolymer No. 1 and about 40 minutes with that from prepolymer No. 2.

The dispersions prepared from both prepolymer No. 1 and prepolymer No. 2 were stripped of the toluene solvent and then tested for film-forming properties as described in Example XXII. An excellent film characterized by a complete absence of cracks was obtained from each dispersion. Both dispersions were mechanically stable as evidenced by the fact that the emulsions showed no sign of separation after standing for 1 month.

While there has been shown and described hereinabove the present preferred embodiments of this invention, it is to be understood that various changes, alterations, and modifications can be made thereto without departing from the spirit and scope thereof as defined in the appended claims.

What is claimed is:

1. In the process for the production of mechanically stable aqueous dispersions of polyurethane polymers by reacting together (I) isocyanate-terminated polyurethane polymer formed from (a) active hydrogen containing organic compound and (b) organic polyisocyanate, and (II) chain extender containing active hydrogen the improvement comprising mixing polymer (I) with water, dispersing said polymer (I) in the water at an initial temperature of from about −5 to 20° C., and adding said chain extender (II) to said water dispersion of polymer (I) with agitation.

2. The process of claim 1 wherein said polymer (I) is dispersed in water by a high shear mixer.

3. The process of claim 2 wherein said mixture of polymer (I) and water is cooled to a temperature of from about 0 to 20° C.

4. The process of claim 2 wherein said active hydrogen containing organic compound (a) has an average molecular weight of from about 300 to 10,000.

5. The process of claim 4 wherein said active hydrogen containing organic compound (a) is a polyester.

6. The process of claim 4 wherein said active hydrogen containing organic compound (a) is a polyalkylene ether glycol.

7. The process of claim 4 wherein said active hydrogen containing organic compound (a) is a polypropylene ether glycol.

8. The process of claim 4 wherein said organic polyisocyanate (b) is tolylene diisocyanate.

9. The process of claim 4 wherein said organic polyisocyanate (b) is p,p′-diphenylmethane diisocyanate.

10. The process of claim 4 wherein said chain extender (II) is an organic diamine.

11. The process of claim 4 wherein said chain extender (II) is dichloro-diamino diphenylmethane.

12. The process of claim 4 wherein said chain extender (II) is hexamethylene diamine.

13. The process of claim 4 wherein said chain extender (II) is 2-methylpiperazine.

14. The process of claim 4 wherein said chain extender (II) is a polyalkylene ether glycol.

15. The process of claim 4 wherein said polymer (I) is first dissolved in an organic solvent prior to dispersion in water.

16. The process of claim 4 wherein the ratio of said organic polyisocyanate compound (b) to said active hydrogen containing compound (a) is such that the NCO/OH ratio is greater than about 1.3:1, said chain extender (II) is employed in amounts to provide an active hydrogen/NCO ratio of from about 0.75:1 to 1.9:1, and said polymer (I) is mixed with water in a weight ratio of polymer (I) to water of from about 1:4 to 2:1.

17. The process of claim 16 wherein said high shear mixer is an ultrasonic homogenizer.

18. The process of claim 16 wherein said high shear mixer is a valve homogenizer.

19. The process of claim 16 wherein said chain extender (II) is mixed with water and cooled to a temperature of from about 0 to 20° C. prior to adding to said water dispersion of polymer (I).

References Cited

UNITED STATES PATENTS

| | | | |
|---|---|---|---|
| 2,968,575 | 1/1961 | Mallonee | 260—29.2 |
| 3,148,173 | 9/1964 | Axelrood | 260—29.2 |
| 3,178,310 | 4/1965 | Berger et al. | 260—29.2 |
| 3,213,049 | 10/1965 | Heiss | 260—29.2 |

OTHER REFERENCES

"Introduction to Emulsions," Sutheim, TP156E658, Chemical Publishing Co., New York, N.Y., 1947, pp. 107–115.

MURRAY TILLMAN, Primary Examiner.

JOHN C. BLEUTGE, Primary Examiner.

U.S. Cl. X.R.

117—155, 161; 260—75, 77.5